United States Patent [19]

Kato

[11] Patent Number: 4,633,342
[45] Date of Patent: Dec. 30, 1986

[54] ROTARY HEAD TYPE MAGNETIC RECORDING AND REPRODUCING DEVICE

[75] Inventor: Takahiro Kato, Saitama, Japan

[73] Assignee: Pioneer Electric Corporation, Tokyo, Japan

[21] Appl. No.: 766,317

[22] Filed: Aug. 16, 1985

[30] Foreign Application Priority Data

Aug. 18, 1984 [JP] Japan ................................. 59-172160

[51] Int. Cl.⁴ .............................................. G11B 5/52
[52] U.S. Cl. ..................................................... 360/75
[58] Field of Search ........................................... 360/75

[56] References Cited

U.S. PATENT DOCUMENTS 4,584,618  4/1986  Tassery .................................. 360/75

*Primary Examiner*—George G. Stellar
*Attorney, Agent, or Firm*—Sughrue, Mion, Zinn, Macpeak and Seas

[57] ABSTRACT

A rotary head type magnetic recording and reproducing device in which sub-code data can readily and accurately be read from an inclined track recorded on the tape when the tape is moving at a high speed in either direction. The rotational position of the rotary head is sensed. When the head is at a predetermined angular position, its rotation is stopped by a brake mechanism. The sub-code data is then reproduced from the tape.

9 Claims, 5 Drawing Figures

ROTARY HEAD TYPE MAGNETIC RECORDING AND REPRODUCING DEVICE

BACKGROUND OF THE INVENTION

The present invention relates to rotary head type magnetic recording and reproducing devices such as rotary head type digital audio tape recorders (RDAT) and video tape recorders (VTR), and more particularly, to a rotary head type magnetic recording and reproducing device having a high speed searching function.

In a VTR or RDAT, a rotary head is used to record data on a magnetic tape run at a fixed speed and to reproduce the data. In a RDAT in which a magnetic tape 3.8 mm in width is wound on a rotary drum 30 mm in diameter for 90° and mainly digital audio signals are recorded or reproduced (sometimes, however, still picture signals or other data may be recorded or reproduced), a particular part of one inclined track is employed as a sub-code area where data other than audio digital data to be recorded or reproduced, such as time data (hours, minutes and seconds) and data indicative of the order of musical selections, are recorded, and the data thus recorded is reproduced in a high speed searching operation. Two sub-code areas each, corresponding to an angle of 1° to 4° out of the winding angle 90°, are provided in one track.

The tape winding angle of such a device, as mentioned above is 90°, namely, smaller than that of an ordinary VTR. Therefore, the magnetic tape can be run at high speed while being wound on the drum. However, the device suffers from a diffuculty that, when the magnetic tape is run in the forward and reverse directions a high speed 200 times (1.44 m/s) the fixed speed (7.22 mm/s) and with the speed of the drum maintained constant (2000 rpm), the relative speed of the magnetic head and the magnetic tape differs greatly depending on the direction the tape is run. While the relative speed is about 3.1 m/s in the fixed speed running operation, in the high speed running operation, the relative speed is about 4.6 m/s in the reverse direction and about 1.7 m/s in the forward direction. Accordingly, in the high speed searching operation, even with one and the same signal, the reproduction frequency greatly differs depending on the tape running direction, which makes it difficult to process the signal.

Reproduction of the sub-code data can be done only at the rate of one sub-code data area per about 200 tracks on the magnetic tape. Therefore, it is impossible to perform the searching operation finely, and the sub-code data is not read out at a fixed period. Furthermore, for the same reason, the device used for extracting only the sub-code data from the reproduced data, including data other than the sub-code data, is necessarily intricate.

As shown in FIG. 1, in the fixed speed running operation, the locus ((a) in FIG. 1) of the magnetic head 1 on the magnetic tape 2 forms an angle of about 6.38° (being the angle of inclination of the inclined track). On the other hand, in the high-speed, forward-direction running operation (fast forwarding operation) the locus forms an angle of about 11.7° (as indicated at (b) in FIG. 1) because the relative speed is decreased. Moreover, in the high-speed reverse-direction running operation (the rewinding operation) the locus forms an angle of about 4.3° because the relative speed is increased. Accordingly, in the high-speed running operation (in the searching operation) the trace angle changes, not only when the magnetic tape is run in the forward direction, but also when it is run in the reverse direction, and the magnetic head traces the magnetic tape obliquely over a plurality of tracks. As a result, the sub-code data is reproduced from the sub-code area 3 over several tracks, which still further makes it difficult to process the signal.

SUMMARY OF THE INVENTION

Accordingly, it is an object of the present invention to provide a rotary head type magnetic recording and reproducing device in which the above-mentioned difficulties have been eliminated.

In accordance with this and other objects, the invention provides a rotary head type magnetic recording and reproducing device in which a rotary head is used to trace a plurality of inclined tracks on a magnetic tape to record or reproduce data, comprising means for detecting a rotational angular position of the rotary head, means for stopping the rotation of the rotary head when the magnetic tape is run at high speed and is at a predetermined rotational angular position, and means for reproducing data recorded in a predetermined part of an inclined track when the rotary head has been stopped by the stopping means.

DESCRIPTION OF THE PREFERRED EMBODIMENTS

Figure 2:
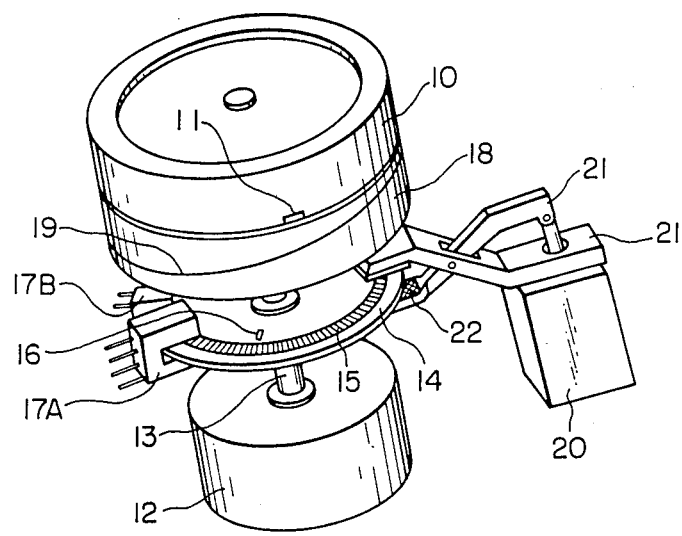
FIG. 2 is a perspective view showing the arrangement of a rotary head type magnetic recording and reproducing device according to the invention.

FIG 2 shows the fundamental arrangement of this invention. In FIG. 2, reference numeral 10 designates in upper drum, namely, a rotary drum which has two magnetic heads 11 positioned 180° apart from each other (only one head 11 being shown in FIG. 2); and 12, a motor having a shaft 13 which rotates the rotary drum 10. The shaft 13 is used to rotate a rotor 14 in association with the rotary drum 10. The rotor 14 has a number of slits 15 and an index hole 16. A photocoupler 17A is disposed so confronting slits 15, and similarly, a photocoupler 17B is disposed confronting the index hole 6. The photocoupler 17A generates one pulse when the rotor 14 makes one revolution. That is, the photocouplers 17A and 17B are pulse generators. If desired, these pulse generators may be implemented with a number of magnetic poles and Hall elements.

Reference numeral 18 designates a lower drum, which is provided below the upper drum 10 and secured to a chassis (not shown). The lower drum 18 has a step-like lead 19 to guide one end of a magnetic tape. Reference numeral 20 designates a plunger which, when actuated, (retracted) drives arms 21 to press their pads 22 against the rotor 14 thereby to mechanically stop the rotation of the rotor 14 (and accordingly the rotary drum 10).

Figure 1:
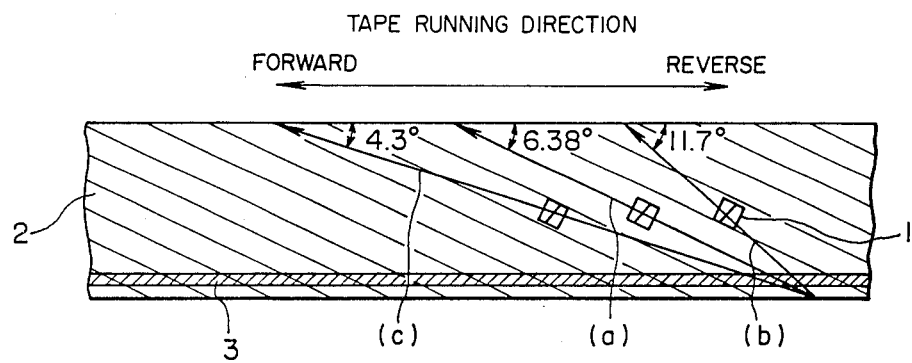
FIG. 1 is an explanatory diagram for a description of a conventional trace angle.

The operation of this apparatus will be described. In order to record digital audio data or sub-code data on the inclined tracks of a magnetic tape, the latter is wound on the drums 10 and 18 for about 90° along the lead 19. The magnetic tape is then run at fixed speed while the rotary drum 10 is rotating. While the first magnetic head 11 turns through 90°, a predetermined number of rotation pulses are detected after the detection of the index hole. In a predetermined period of time, sub-code data is supplied to the first magnetic head 11 from a RAM (not shown) and a predetermined number of rotation pulses are detected, or in a predetermined period of time, audio data is supplied to the first magnetic head 11 from another RAM. When the first magnetic head 11 has turned through 90°, it leaves the magnetic tape. For the period of time from the instant that the magnetic head leaves the magnetic head until the rotary drum 10 turns further through 90° so that the second magnetic head 11 contacts the magnetic tape, no magnetic head 11 is in contact with the magnetic tape. During this idling period of time, audio data, sub-code data, etc., (such as tracking data and self-locking PLL code data) to be recorded on the next inclined track are stored in the RAM. When the second magnetic head 11 contacts the magnetic tape, as in the case of the first magnetic head 11, the next data is recorded on the next adjacent inclined track. Therefore, the audio data and the sub-code data are recorded in predetermined parts of the inclined tracks of the magnetic tape, as shown in FIG. 1 (the tracking area, the PLL part, and another sub-code area being not shown).

In the case of reproducing audio data, the magnetic tape is wound on the drums for 90° and run at a fixed speed while the rotary drum 10 turns. A reference pulse (one per revolution) and rotation pulses are counted, and the PLL code is ecxtracted so that the audio data and the sub-code data are identified and stored in the respective RAMs. The sub-code data is read out of the RAM and displayed, for instance, as reproduction time data, on a display unit or the like. On the other hand, the audio data is obtained by subjecting to time-axis compression an audio analog signal having a predetermined time duration. Therefore, the audio data is reproduced after being subjected to time-axis expansion (as well as D/A conversion and other necessary processing). With this operation being carried out alternately for the first and second magnetic heads 11, the audio analog signals are reproduced.

In order to search a position on the magnetic tape located a predetermined period of time away from a predetermined music number or music top recorded thereon, the magnetic tape is wound on the drums 10 for 90° and run in the forward or reverse direction at high speed. In this case, the rotary drum 10 is stopped with the magnetic heads 11 confronting the sub-code area 3 (the plunger 20 being excited to cause the arms 21 to hold the rotor 14 thereby to mechanically stop the rotation of the rotor 14). Therefore, the magnetic heads 11 trace the magnetic tape horizontally.

Figure 3:
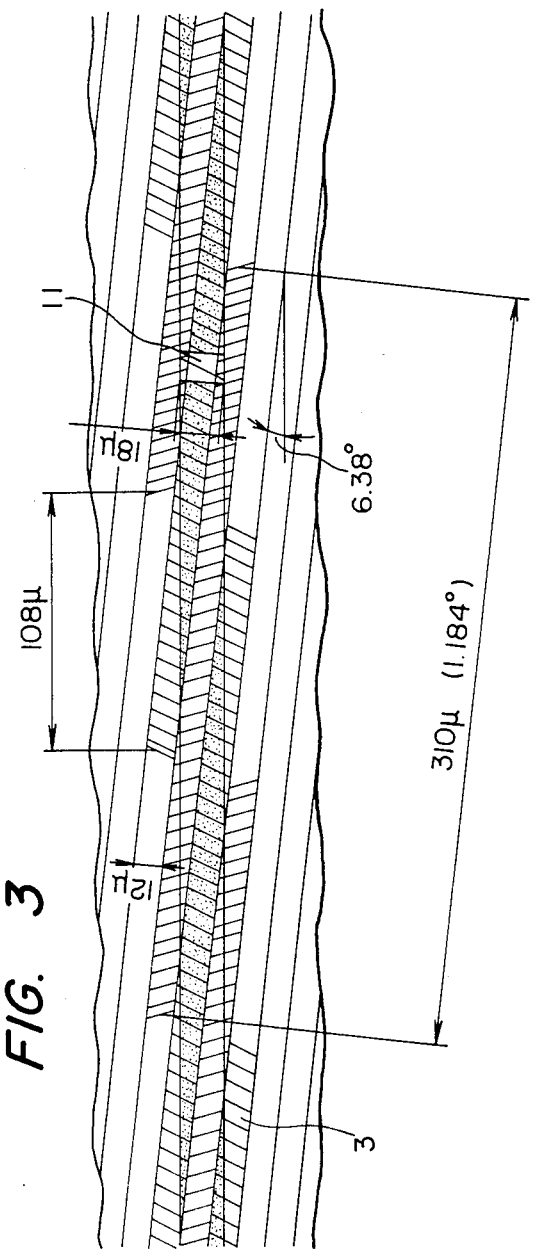
FIG. 3 is an explanatory diagram for a description of a trace angle employed in the device of the invention.

FIG. 3 is an enlarged diagram showing a state in which the magnetic head traces the sub-code area 3 with a track pitch of 12 microns, a track angle of 6.38° (corresponding to a winding angle of 1.184°) and a head gap width of 18 microns. For convenience in description, the inclination angle of the inclined track in FIG. 1 is assumed to be larger than that in FIG. 3. As is apparent from the figure, in order to suppress crosstalk, the first and second magnetic heads have different azimuth angles. Because no signal can be reproduced from a track of an azimuth angle different from that of the head, sub-code data is reproduced every other track. Accordingly, when the signal of a track is being reproduced, the signals of other tracks are scarcely reporduced, and therefore the signal processing operation can be achieved readily. It goes without saying that, in order to perform the extraction of data more readily, special identification codes may be inserted before and after the data to be extracted. In the case where the magnetic tape is run in the opposite direction, the order of reproduction of data is also reversed. In this case, the order of reading data from the RAM or the order of writing data into the RAM should be reversed according to the magnetic tape running direction.

Figure 4:
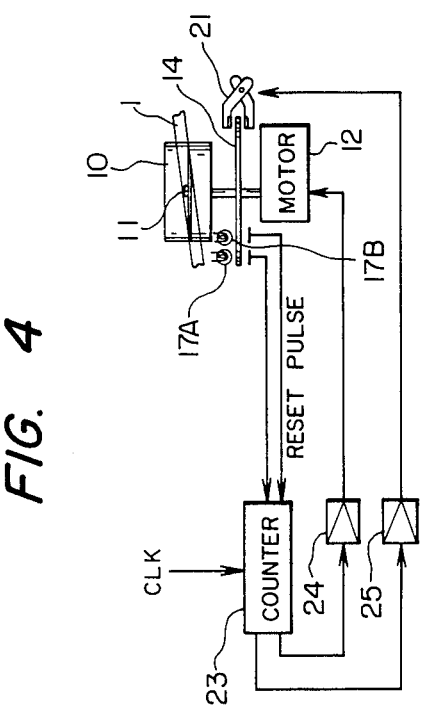
FIG. 4 is a block diagram showing an example of a stopping device in the device of the invention.

FIG. 4 shows an apparatus for stopping the rotary drum 10 in such a manner that the magnetic heads 11 confront the sub-code area 3. In FIG. 4, reference numeral 23 designates a counter (for instance, an up-down counter which increases or decreases its count value according to the direction of rotation). The counter 23 counts rotation pulses outputted by the photocoupler 17A, and the count value of the counter is reset to zero by a reset (reference) pulse produced by the photocoupler 17B once per revolution. If desired, predetermined value can be loaded into the counter 23 at the reset time. Further in FIG. 4, reference numerals 24 and 25 designate drivers for driving the motor 12 and the arms 21 (brakes), respectively.

The value set in the counter 23 in advance is selected to be equal, for instance, to the number of rotation pulses produced in the time period during which the magnetic heads 11 confront the sub-code area 3 so that a difference signal is produced representing the difference between the set value and a count value at a given time instant. Therefore, if the rotation of the motor 12 is servo controlled so that the difference signal becomes zero, the magnetic heads 11 can be positioned as desired. When the difference output is stabilized (for instance, when the output is zero for a certain period of time), the counter 23 outputs a signal so that the driver 25 operates the brakes to mechanically lock the rotary drum at the predetermined position.

Figure 5:
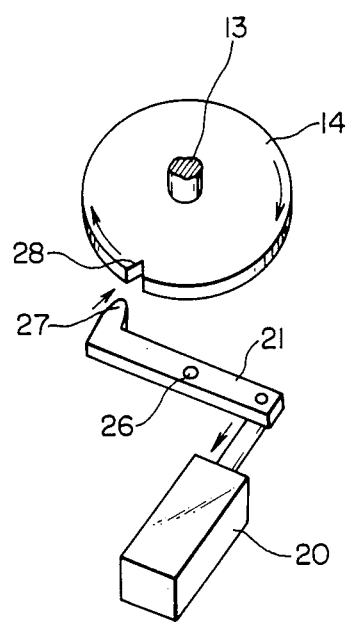
FIG. 5 is a perspective view showing another example of the stopping device.

FIG. 5 shows another embodiment of an apparatus for mecahnically locking the rotary drum. In this embodiment, when a plunger 20 is excited, an arm 21 is turned about a fulcrum 26 so that a protrusion 27 engages with a cut 28 in the rotor 14 to stop the latter. It goes without saying that the cut 28 may be formed directly in the rotary drum 10. In this embodiment, the position detector serves as stopping means also. Therefore, this embodiment results in a simpler construction.

As is apparent from the above description, according to the invention, in the searching operation, the rotary head is substantially fixed at a predetermined position. Therefore, the relative speed is maintained unchanged, irrespective of the magnetic tape running direction. Furthermore, the probability of reading data such as sub-code data from the inclined track is increased, while the probability of reproducing the data of different tracks simultaneously is decreased. Thus, the signal processing operation is considerably simple. Accordingly, the data area can be reduced, and therefore the available region of data to be recorded and reproduced can be increased.

I claim:

1. A rotary head type meagnetic recording and reproducing device in which a rotary head is used to trace a plurality of inclined tracks on a magnetic tape to record or reproduced data, comprising: means for detecting a rotational angular position of said rotary head; means for stopping rotation of said rotary head at a predetermined rotational angular position thereof while said tape is being run at a high speed; and means for reproducing data recorded in a predetermined part of an inclined track when said rotary head has been stopped by said stopping means.

2. The device as claimed in claim 1, wherein said detecting means comprises: a pulse generator which rotates in association with said rotary head to generates pulses; and a counter for counting said pulses.

3. The device as claimed in claim 2, wherein said stopping means comprises means for controlling an electric motor driving said rotary head according to an output of said counter.

4. The device as claimed in claim 1, 2 or 3, wherein said stopping means comprises means for mechanically locking a member which rotates in association with said rotary head.

5. The device as claimed in claim 1, 2 or 3, further comprising: means for writing reproduced data in a RAM once and then reading said data out of said RAM, an order of writing said data in said RAM and reading said data therefrom being reversed according to a direction in which said magnetic tape is run at high speed.

6. The device as claimed in claim 2, wherein said pulse generator comprises a slit portion.

7. The device as claimed in claim 2, wherein said detecting means has a hole formed therein for detecting a position of said rotary head.

8. The device as claimed in claim 4, wherein said stopping means comprises an arm portion for stopping rotation of said rotary head.

9. The device as claimed in claim 4, wherein said member has a cut portion.

* * * * *